United States Patent
Wang

(10) Patent No.: US 7,561,358 B2
(45) Date of Patent: Jul. 14, 2009

(54) MULTI-REGISTER READ CHANNEL OPTIMIZATION

(75) Inventor: Richard Wang, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 430 days.

(21) Appl. No.: 11/601,055

(22) Filed: Nov. 16, 2006

(65) Prior Publication Data

US 2008/0117538 A1    May 22, 2008

(51) Int. Cl.
*G11B 27/36* (2006.01)
(52) U.S. Cl. .............................. 360/31; 360/46; 360/65; 360/67
(58) Field of Classification Search ........................ None
See application file for complete search history.

(56) References Cited

U.S. PATENT DOCUMENTS

| | | | | |
|---|---|---|---|---|
| 5,585,974 | A * | 12/1996 | Shrinkle ....................... | 360/46 |
| 6,404,570 | B1 * | 6/2002 | McNeil et al. ................ | 360/31 |
| 6,504,868 | B1 * | 1/2003 | Koizumi ...................... | 375/232 |
| 7,376,210 | B2 * | 5/2008 | Kim et al. .................... | 375/350 |
| 2002/0057508 | A1 * | 5/2002 | Seng et al. .................... | 360/46 |
| 2004/0165303 | A1 * | 8/2004 | Wu et al. ...................... | 360/65 |

* cited by examiner

*Primary Examiner*—Jason C Olson
(74) *Attorney, Agent, or Firm*—Ben J. Yorks; Irell & Manella LLP

(57) ABSTRACT

A method for optimizing read/write channel parameters of a hard disk drive. The process includes measuring a first bit error rate of a head using an initial set of read/write channel parameters and varying all of the read/write channel parameters with a random jump. The random jump may be created from the generation of a random number. The process then includes measuring a second bit error rate of the head using the varied read channel parameters and accepting the varied read/write channel parameters as the new optimum, if the second bit error rate is lower than the first bit error rate.

28 Claims, 4 Drawing Sheets

MULTI-REGISTER READ CHANNEL OPTIMIZATION

BACKGROUND OF THE INVENTION

1. Field of the Invention

The present invention relates to a method for writing data onto a disk of a hard disk drive.

2. Background Information

Hard disk drives contain a plurality of magnetic heads that are coupled to rotating disks. The heads can magnetize and sense the magnetic fields of the disks to write and read data, respectively. The heads are coupled to a pivoting actuator arm that has a voice coil motor.

Data is typically stored on tracks that extend radially across the disk surfaces. The voice coil motor can be energized to pivot the actuator arm and move the heads to different track locations. Each track is typically divided into a number of sectors. Each sector contains at least one data field.

The disk drive typically writes data in blocks across a number of data sectors. Data is written by providing a write current to a coil of each head. The coil generates a magnetic flux that magnetizes the disk. Conversely, data is read through a read element in the head that sense a magnetic field provides a waveform to a pre-amplifier. The waveform is digitized and processed into a series of bits.

The read/write signal is processed using a number of read/write channel parameters. By way of example, there may be read channel parameters like cutoff frequency, gain, and boost; and write channel parameters like write current, overshoot, and write pre-compensation. Head characteristics may vary between heads. To compensate for this variation the heads are typically tested to optimize the read/write channel parameters.

Historically read/write channel parameters are optimized one parameter at a time. This is a time consuming step in test process. Additionally, some of the parameters are interdependent so that varying one parameter may change the optimum value for another parameter. This increases development time to understand and deal with the interdependence effect. It would be desirable to provide a process to optimize read/write channel parameters that is efficient and accounts for co-dependency between parameters.

BRIEF SUMMARY OF THE INVENTION

A method for optimizing read channel parameters of a hard disk drive. The process includes measuring a first bit error rate of a head using an initial set of read/write channel parameters and varying the read/write channel parameters with a random jump. The process then includes measuring a second bit error rate of the head using the varied read/write channel parameters and determining whether the new set of channel parameters is a better optimum.

DETAILED DESCRIPTION

Disclosed is a method for optimizing read/write channel parameters of a hard disk drive. The process includes measuring a first bit error rate of a head using an initial set of read/write channel parameters and varying all of the read/write channel parameters with a random jump. The random jump may be created from the generation of a random number. The process then includes measuring a second bit error rate of the head using the varied read/write channel parameters, and accepting the varied channel parameters as a better optimum if the second bit error rate is lower than the first bit error rate. By varying all of the parameters for each step the process provides a more spatial approach as opposed to the discrete linear approach found in the prior art, where each parameter is independently optimized.

Figure 1:
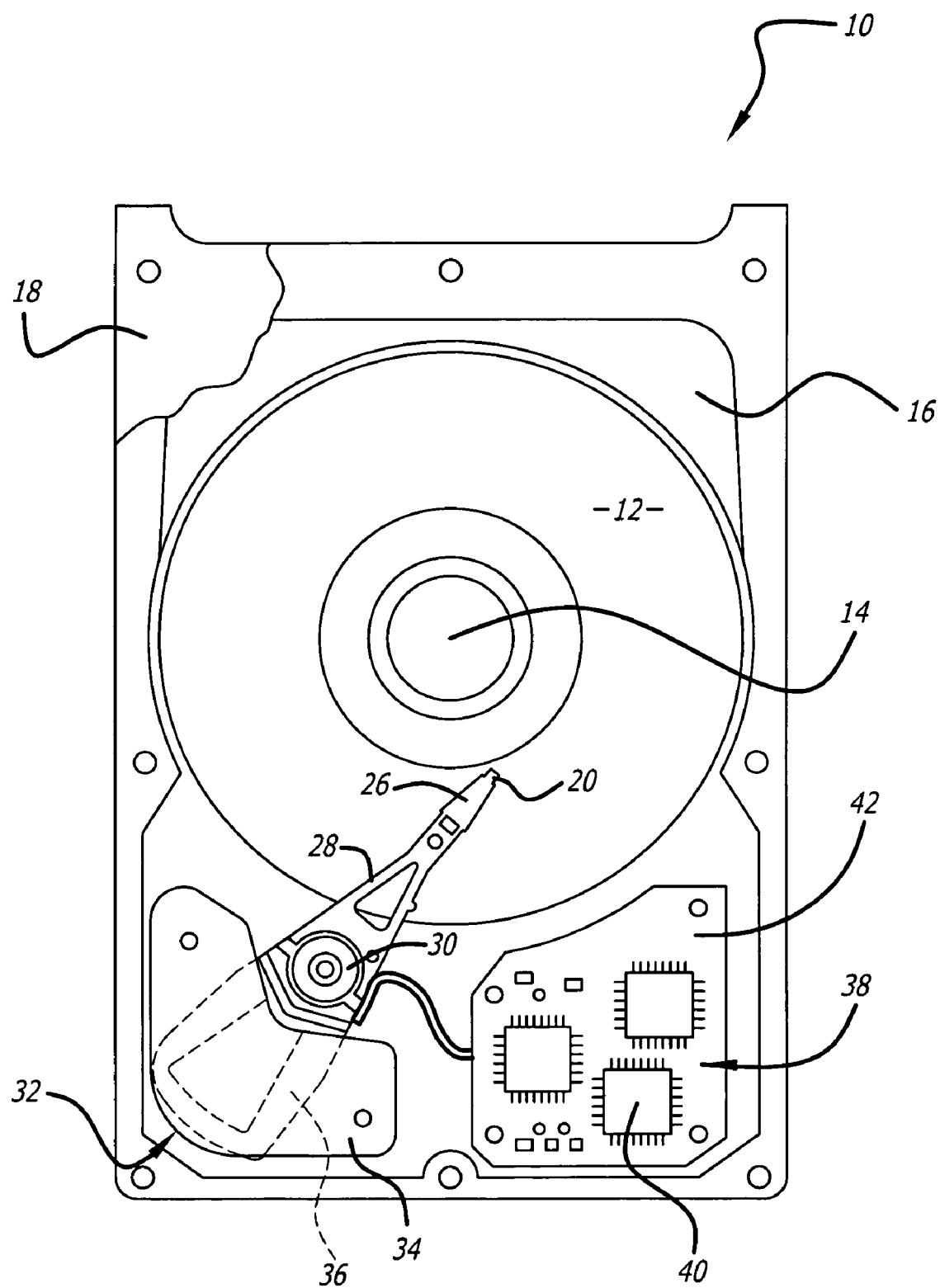
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 2:
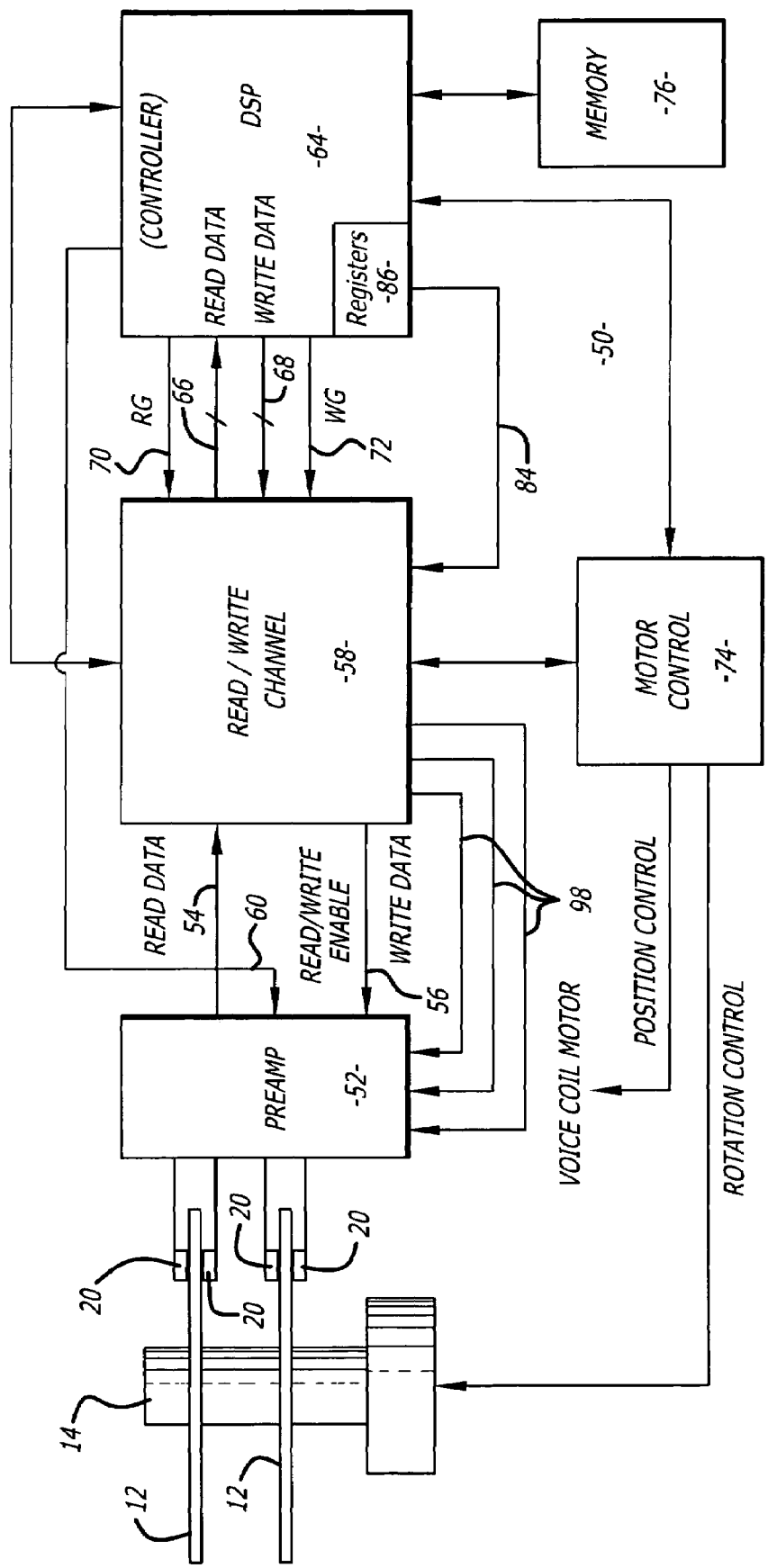
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM").

Figure 3:
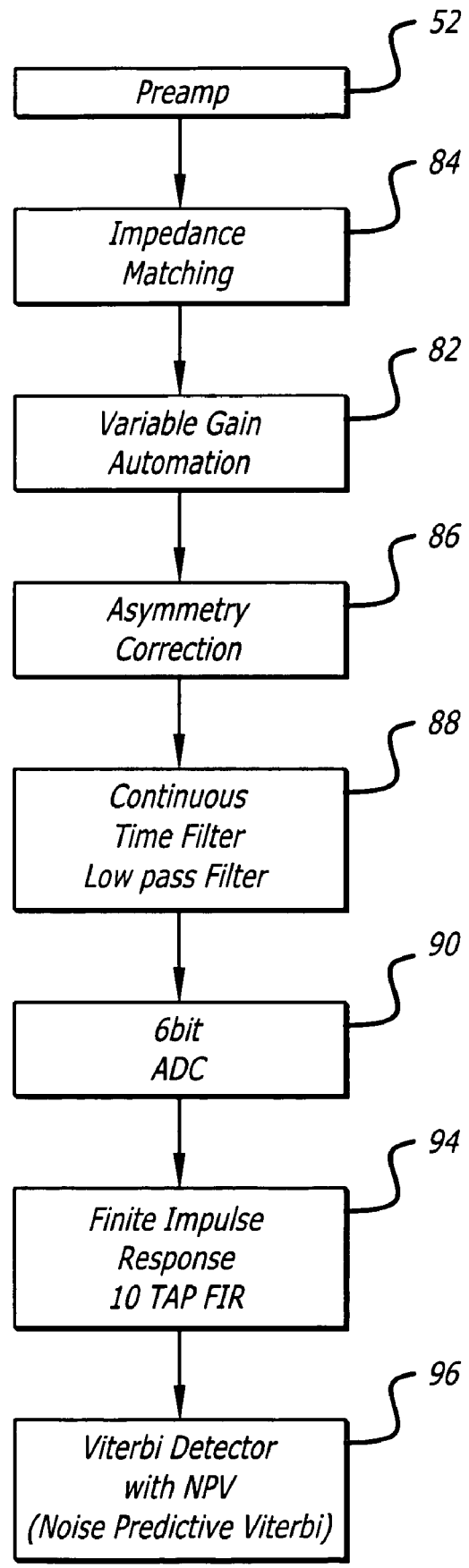
FIG. 3 is a schematic of a read/write channel of the electrical circuit.

FIG. 3 is a block diagram showing the different functional circuits for reading a disk. The functional circuits include an automatic gain control (AGC) circuit 82 coupled to the pre-amplifier 52 by an impedance matching circuit 84. The AGC circuit 82 provides automatic gain control of the waveform read from the disk.

The functional circuits may further contain an asymmetry correction circuit 86, a continuous time low pass filter 88, and an analog to digital converter 90 that condition, filter and convert the waveform to a digital bit stream. The bit stream is provided to a finite impulse response (FIR) circuit 94 that equalizes the signal. The data is further provided to a Viterbi detector 96, preferably a noise predictive Viterbi.

The pre-amp 52 and read/write channel 58 typically have a number of different read/write channel parameters such as gain, cutoff frequency, write current, overshoot control, and pre-compensation. The values of the parameters in the pre-amp 52 can be set through the control lines 98 shown in FIG. 2. The values may be set by the read/write channel circuit 58. The read/write channel circuit 58 may obtain the values from the controller 64 through line 84. The values may be stored in registers 86 of the controller 64.

Figure 4:
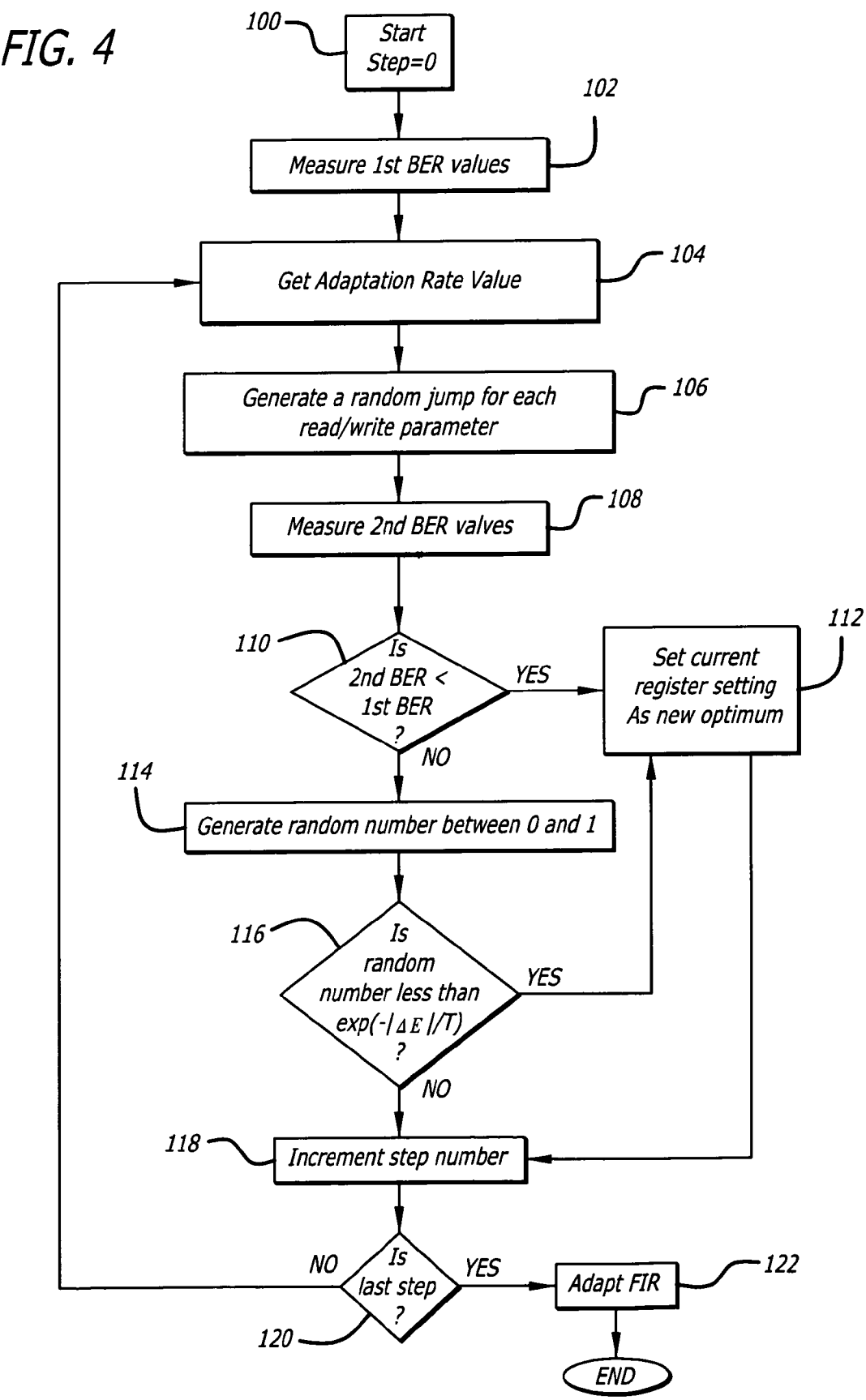
FIG. 4 is a flowchart of a process for optimizing a plurality of read/write channel parameters for the read channel.

FIG. 4 shows an exemplary flowchart for a process to optimize the read channel parameters. The process can be performed by the controller of the disk drive, and/or computer or other equipment external to the drive. In block 100 the step is set to 0 and the bit error rate ("BER") of a head is measured in block 102. The adaptation rate is determined in block 104. The adaptation rate can be based on a table or schedule. The adaptation rate is a series of values that are predetermined in accordance with a schedule, table, or formula. The adaptation rate usually, but not necessarily, starts at a fast rate and changes to a slow rate as the optimization process moves closer to the optimum state.

In block 106 a random jump in the value of each read channel parameter is generated. The jump is based on the generation of a random number. The distribution of the random number may be dependent on the adaptation rate. By way of example, the distribution may be wider for an initial fast adaptation rate than a later slower adaptation rate in the process. Additionally, the random jumps may be scaled so that each parameter will produce approximately the same bit error rate change for each jump. This maintains uniform register sensitivity, independent of the number of bits in a register. The process may also provide outer limits on the parameter values.

The bit error rate of the head is then measured with the new parameters in block 108. In decision block 110 the process determines whether the second BER is lower than the first BER. If it is, the new read channel parameters established in block 106 are accepted and stored in the registers as the optimum values in block 112. The process then proceeds to block 118 to increase the step number.

If the second BER is not lower than the first BER then the process generates a random number between 0.0 and 1.0 in block 114. In decision block 116 the random number is compared to the inverse exponential value of the difference between the first and second BER values ΔE, divided by the adaptation rate. If the random number is less than the inverse exponential then the values established in block 106 are accepted and stored in the registers in block 112 are even though the BER is worse. If the random number is greater than the inverse exponential then the values in block 106 are rejected and the values in block 112 are left as is. In other words, when the second BER is higher than the first, the values in block 106 are usually accepted when adaptation rate is fast and usually rejected when the adaptation rate is slow. The step number is incremented in block 118 in both cases.

Decision block 120 determines whether the process has reached the last step. If it is not the last step, then the process returns to step 104. If it is the last step then the optimization process ends and the channel values in block 112 is the final optimum. The finite impulse response filter 122 is then optimized according to the final optimum channel setting.

Varying all of the parameters in block 104 minimizes the time required to optimize the read/write channel parameters and also accounts for co-dependency between parameters.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for optimizing a plurality of read channel parameters for a hard disk drive, comprising:
   measuring a first bit error rate of a head using an initial set of read/write channel parameters;
   providing an adaptation rate value;
   varying the read/write channel parameters with a random jump that is a function of the adaptation rate value;
   measuring a second bit error rate of the head using the varied read/write channel parameters;
   accepting and storing the varied read/write channel parameters if the second bit error rate is lower than the first bit error rate.

2. The method of claim 1, further comprising, if the second bit error rate is not lower than the first bit error rate, then generating a random number between 0.0 and 1.0, comparing the random number with an inverse exponential of the difference between the first and second bit error rates, divided by the adaptation rate, and accepting the varied read/write channel parameters as an optimum if the random number is less than the inverse exponential.

3. The method of claim 1, further comprising obtaining a new adaptation rate value and repeating the process of varying the read/write channel parameters, measuring a new bit error rate and storing the varied read/write channel parameters if the new bit error rate is lower than the previous bit error rate.

4. The method of claim 1, further comprising optimizing a finite impulse response filter with the read/write channel parameters.

5. The method of claim 1, wherein the read channel parameters include a write current parameter, a gain, a cutoff frequency parameter, and a overshoot parameter.

6. The method of claim 1, wherein a distribution of the random jump is dependent on the adaptation rate value.

7. The method of claim 1, wherein the random jump of the read channel parameters is scaled.

8. A hard disk drive, comprising:
   a disk;
   a spindle motor that rotates said disk;
   a head coupled to said disk;
   an actuator arm coupled to said head;
   a voice coil motor coupled to said actuator arm;
   a plurality of read channel registers; and,
   a controller that performs a process for optimizing a plurality of read channel parameters, the process including;
      measuring a first bit error rate of said head using an initial set of read channel parameters;
      providing an adaptation rate value;

varying the read/write channel parameters with a random jump that is a function of the adaptation rate value;

measuring a second bit error rate of said head using the varied read channel parameters;

storing the varied read channel parameters in said registers if the second bit error rate is lower than the first bit error rate.

9. The disk drive of claim 8, wherein the process further comprises, if the second bit error rate is not lower than the first bit error rate, then generating a random number between 0.0 and 1.0, comparing the random number with an inverse exponential of the difference between the first and second bit error rates, divided by the adaptation rate, and accepting the varied read/write channel parameters as an optimum if the random number is less than the inverse exponential.

10. The disk drive of claim 8, wherein the process further comprises obtaining a new adaptation rate value, and repeating the process of varying the read/write channel parameters, measuring a new bit error rate and accepting the varied read channel parameters as an optimum if the new bit error rate is lower than the previous bit error rate.

11. The disk drive of claim 8, wherein the process further comprises optimizing a finite impulse response filter with the read channel parameters.

12. The disk drive of claim 8, wherein the read/write channel parameters include a write current parameter, a gain, a cutoff frequency parameter, and a overshoot parameter.

13. The disk drive of claim 8, wherein a distribution of the random jump is dependent on the adaptation rate.

14. The disk drive of claim 8, wherein the random jump of the read channel parameters is scaled.

15. A hard disk drive, comprising:
a disk;
a spindle motor that rotates said disk;
a head coupled to said disk;
an actuator arm coupled to said head;
a voice coil motor coupled to said actuator arm;
a plurality of read channel registers; and,
processor means for performing a process for optimizing a plurality of read channel parameters, the process including;
   measuring a first bit error rate of said head using an initial set of read/write channel parameters;
   providing an adaptation rate value;
   varying the read channel parameters with a random jump that is a function of the adaptation rate value;
   measuring a second bit error rate of said head using the varied read/write channel parameters;
   accepting the varied read channel parameters as an optimum in said registers if the second bit error rate is lower than the first bit error rate.

16. The disk drive of claim 15, wherein the process further comprises, if the second bit error rate is not lower than the first bit error rate, then generating a random number between 0.0 and 1.0, comparing the random number with an inverse exponential of the difference between the first and second bit error rates, divided by the adaptation rate, and accepting the varied read channel parameters as the new optimum if the random number is less than the inverse exponential.

17. The disk drive of claim 15, wherein the process further comprises obtaining a new adaptation rate value, and repeating the process of varying the read channel parameters, measuring a new bit error rate and accepting the varied read channel parameters as the new optimum if the new bit error rate is lower than the previous bit error rate.

18. The disk drive of claim 15, wherein the process further comprises optimizing a finite impulse response filter with the read/write channel parameters.

19. The disk drive of claim 15, wherein the read/write channel parameters include a write current parameter, a gain, a cutoff frequency parameter, and an overshoot parameter.

20. The disk drive of claim 15, wherein a distribution of the random jump is dependent on the adaptation rate.

21. The disk drive of claim 15, wherein the random jump of the read channel parameters is scaled.

22. An apparatus that causes a process to optimize a plurality of read channel parameters for a read/write channel of the hard disk drive, comprising:
a program storage medium that causes a controller to perform a process, the process including;
   measuring a first bit error rate of a head using an initial set of read channel parameters;
   providing an adaptation rate value;
   varying the read channel parameters with a random jump that is a function of the adaptation rate value;
   measuring a second bit error rate of a head using the varied read channel parameters;
   accepting the varied read channel parameters as an optimum in said registers if the second bit error rate is lower than the first bit error rate.

23. The apparatus of claim 22, wherein the process further comprises, if the second bit error rate is not lower than the first bit error rate, then generating a random number between 0.0 and 1.0, comparing the random number with an inverse exponential of the difference between the first and second bit error rates, divided by the adaptation rate, and accepting the varied read/write channel parameters as the new optimum if the random number is less than the inverse exponential.

24. The apparatus of claim 22, wherein the process further comprises obtaining a new adaptation rate value, and repeating the process of varying the read/write channel parameters, measuring a new bit error rate and accepting the varied read/write channel parameters if the new bit error rate is lower than the previous bit error rate.

25. The apparatus of claim 22, wherein the process further comprises optimizing a finite impulse response filter with the read channel parameters.

26. The apparatus of claim 22, wherein the read channel parameters include a write current parameter, a gain, a cutoff frequency parameter and an overshoot parameter.

27. The apparatus of claim 22, wherein a distribution of the random jump is dependent on the adaptation rate.

28. The apparatus of claim 22, wherein the random jump of the read channel parameters is scaled.

* * * * *